United States Patent
Matsuda

(10) Patent No.: US 7,092,132 B2
(45) Date of Patent: Aug. 15, 2006

(54) IMAGE READING APPARATUS AND IMAGE INPUT/OUTPUT SYSTEM

(75) Inventor: Shinya Matsuda, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 1181 days.

(21) Appl. No.: 09/775,680

(22) Filed: Feb. 5, 2001

(65) Prior Publication Data

US 2001/0015830 A1    Aug. 23, 2001

(30) Foreign Application Priority Data

Feb. 7, 2000    (JP) ............................. 2000-029042

(51) Int. Cl.
*H04N 1/04*    (2006.01)
*H04N 1/387*    (2006.01)

(52) U.S. Cl. ................... 358/909.1; 358/474; 358/486; 358/494; 358/497; 358/450; 348/218.1; 348/219.1; 348/36; 348/37; 348/39

(58) Field of Classification Search ............. 358/909.1, 358/474, 497, 494, 450, 527, 505, 486; 348/218.1, 348/219.1, 36, 39, 37; 382/312, 284, 318, 382/319, 248
See application file for complete search history.

(56) References Cited

U.S. PATENT DOCUMENTS

| 5,452,105 | A |   | 9/1995 | Tamagaki et al. ........... 358/453 |
| 5,663,806 | A | * | 9/1997 | Grise et al. .................. 358/406 |
| 6,330,001 | B1 | * | 12/2001 | Nakao ......................... 345/629 |
| 6,459,819 | B1 | * | 10/2002 | Nakao ......................... 382/284 |
| 6,512,539 | B1 | * | 1/2003 | Dance et al. ............... 348/203 |
| 6,540,415 | B1 | * | 4/2003 | Slatter et al. ............... 396/428 |
| 6,639,625 | B1 | * | 10/2003 | Ishida et al. ............. 348/218.1 |
| 6,727,954 | B1 | * | 4/2004 | Okada et al. ............... 348/374 |
| 6,771,396 | B1 | * | 8/2004 | Cheatle et al. ............. 358/474 |
| 6,885,479 | B1 | * | 4/2005 | Pilu ........................... 358/474 |
| 6,891,643 | B1 | * | 5/2005 | Matsuda ..................... 358/471 |
| 6,904,183 | B1 | * | 6/2005 | Slatter ........................ 382/284 |

FOREIGN PATENT DOCUMENTS

JP          2001-7978          1/2001

* cited by examiner

*Primary Examiner*—Cheukfan Lee
(74) *Attorney, Agent, or Firm*—McDermott Will & Emery LLP

(57) ABSTRACT

The purpose of obtaining a high resolution image with fewer number of image sensings in an image input device which allocates a planar object such as a document or the like into a plurality of areas for image sensing, and combines the obtained image data for output to a printer or display device or the like.

An image reading device using an area sensor as an image sensing element 30 which is stationary in an image sensing unit 14 facing the center of a document 1 on a table 11, and a taking lens 31 moves parallel to the document 1 and the image sensing element 30 to read the images of allocated sections A~I of the document 1.

16 Claims, 7 Drawing Sheets

IMAGE READING APPARATUS AND IMAGE INPUT/OUTPUT SYSTEM

RELATED APPLICATION

This application is based on Patent Application No. 2000-029042 filed in Japan, the entire content of which is hereby incorporated by reference.

BACKGROUND OF THE INVENTION

1. Field of the Invention

The present invention relates to an image input device for two-dimensionally scanning a planar object (hereinafter referred to as the "document") such as, for example, a document, photograph and the like, and reading the image data thereby, and an image input/output system using the image input device.

2. Description of the Related Art

Drum type scanners and flatbed type scanners are known as conventional image input devices (scanners) capable of reading the image data of documents at high resolution.

In the case of drum scanners, a document is adhered to the inside of a transparent hollow drum formed, for example, of glass or the like, and the drum is rotated about a center axis at constant speed (main scan). Furthermore, a point sensor is moved parallel to the center axis of the drum from the exterior side of the drum (subscan) to obtain the image data of all regions of the document.

In the case of flatbed scanners, a document is placed face down on the surface of a transparent document table formed of, for example, glass, and a line sensor integrated with an illumination device moves in a direction (subscan) perpendicular to the array direction (main scan direction) of photoelectric conversion elements of the line sensor so as to obtain the image data of the entire region of the document.

In the case of a drum scanner, it is possible to increase the number of image sensings and increase the resolution by slowing both the speed in a first main scan direction (drum rotation speed) and the speed in the subscan direction (sensor moving speed), or shortening the cycle of the sensor load accumulation time and the load transfer time. However, the former method lengthens time required for image sensing of a single document, thus slowing the image sensing speed, On the other hand, the latter method shortens the load accumulation time of each image sensing and reduces S/N due to the small load accumulated by each photoelectric conversion element. Although it is possible to increase S/N by increasing the brightness of the illumination device, a disadvantage arises in that energy consumption also increases. Furthermore, since a large drive device is required due to rotate the heavy drum at high speed, another disadvantage arises in that a great deal of energy is consumed.

In the case of a flatbed scanner, the resolution in the main scan direction is determined by the number of pixels of the line sensor, and the resolution cannot be changed. On the other hand, it is possible to increase the number of image sensing to improve the resolution by reducing the speed (sensor moving speed) in the subscan direction, or shortening the cycle of the sensor load accumulation time and load transfer time so as to increase the resolution in the subscan direction. However, in the case of a drum scanner, the time required to sense one image is lengthened, and the image sensing speed is slowed, similar to the case of a drum scanner. In the latter case, on the other hand, the load accumulation time is shortened such that the S/N is reduced due to the light load accumulation on each photoelectric conversion element. Although it is possible to increase the S/N by increasing the brightness of the illumination device, a disadvantage arises in that energy consumption also increases. Furthermore, since a large drive device is required due to rotate the heavy drum at high speed, another disadvantage arises in that a great deal of energy is consumed.

In both drum scanners and flatbed scanners, the main scan direction and the subscan direction are determined by the mechanical construction, and may not necessarily match the main scan direction and the subscan direction of the image data output device, e.g., a display device such as a CRT, or a printer such as a laser printer. Since the main scan direction of the scanner and the main scan direction of the output device may not match, disadvantages arise inasmuch as the transmission efficiency of the obtained image data is lowered, and high speed processing is not possible.

SUMMARY OF THE INVENTION

An object of the present invention is to eliminate the aforesaid problems of the conventional examples. A further object of the present invention is to provide an image input device capable of scanning in optional directions to match the main scan direction of an output device while controlling energy consumption. A still further object of the present invention is to provide an image input/output system capable of reducing the time required for image input and output.

These and other objects are attained by an image reading apparatus provided with an image sensing unit for reading a document by allocating a specific region into a plurality of two-dimensional areas; a processor for setting various sequences for reading by the allocated region by the image sensing unit; and a controller for controlling the image sensing unit so as to read the allocated region in a set sequence.

These objects of the present invention are further attained by the image reading apparatus which forms a matrix by aligning a plurality of two-dimensional areas in a vertical direction and a horizontal direction.

These objects of the present invention are further attained by the image reading apparatus which reads the matrix of a plurality of two-dimensional areas sequentially in a horizontal direction and a vertical direction.

These objects of the present invention are further attained by the image reading apparatus, wherein the image sensing unit includes an area sensor for receiving an optical image and converting the image to digital data, and an optical system for directing an optical image of a portion of a fixed original to the area sensor, and wherein the controller modifies the position of the optical system relative to a specific region.

These objects of the present invention are further attained by the image reading apparatus, wherein the processor sets a reading sequence based on the specifications from a connected output device for the output of a read image.

These objects of the present invention are further attained by the image reading apparatus, wherein the output device is an image forming apparatus for outputting read images on paper, and provides specifications relating to the orientation of the paper on which the image is to be formed.

These objects of the present invention are attained by an image reading apparatus provided with an image sensing element for receiving an optical image in a two-dimensional section and converting the image to digital data; a modification means for directing the optical image of one section to the image sensing element after allocating a specific region into a plurality of sections, and modifying the section of the specific region of the optical image directed to the image sensing element and a controller for controlling the modification sequence by the modification means, wherein the controller controls the modification means by a plurality of modification sequences.

The objects of the present invention are attained by the image reading apparatus, wherein the image sensing unit includes an area sensor.

The objects of the present invention are attained by the image reading apparatus, which includes a document table for placing a document, wherein the specific region is a range including a document placed on a stationary table.

The objects of the present invention are attained by the image reading apparatus, wherein the image sensing element is stationary relative to the document table, and the modification means switches the section by changing the position of the optical system relative to the image sensing element and the document table.

The objects of the present invention are attained by the image reading apparatus, wherein the modification means changes the position of the image sensing element and the optical system relative to the document.

The objects of the present invention are attained by an image input/output system provided with an input device for allocating an image of a document into a plurality of two-dimensional areas and sequentially reading these areas; an output device for pasting a read image on a sheet for output, wherein the output device outputs an image sequentially from one edge of the sheet to many edges, and the reading sequence is determined by the orientation of the sheet onto which the image is output.

The objects of the present invention are attained by the image input/output system, wherein the input device includes a document table on which a document is placed, and a scanner which allocates a document placed on the document table into a two-dimensional region from above for image sensing.

The objects of the present invention are attained by the image input/output system, wherein a previously read image is sequentially output before the reading of the document image is completed.

The objects of the present invention are attained by the image input/output system provided with a receiver for receiving instructions relating to output from a user, wherein the orientation of the output sheet is determined by the received instructions.

The objects of the present invention are attained by the image input/output system provided with a plurality of cassettes accommodating sheets having different orientations, wherein the instructions designate a cassette.

The objects of the present invention are attained by the image input/output system, wherein the output device is a display comprising pixels arranged in a matrix.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
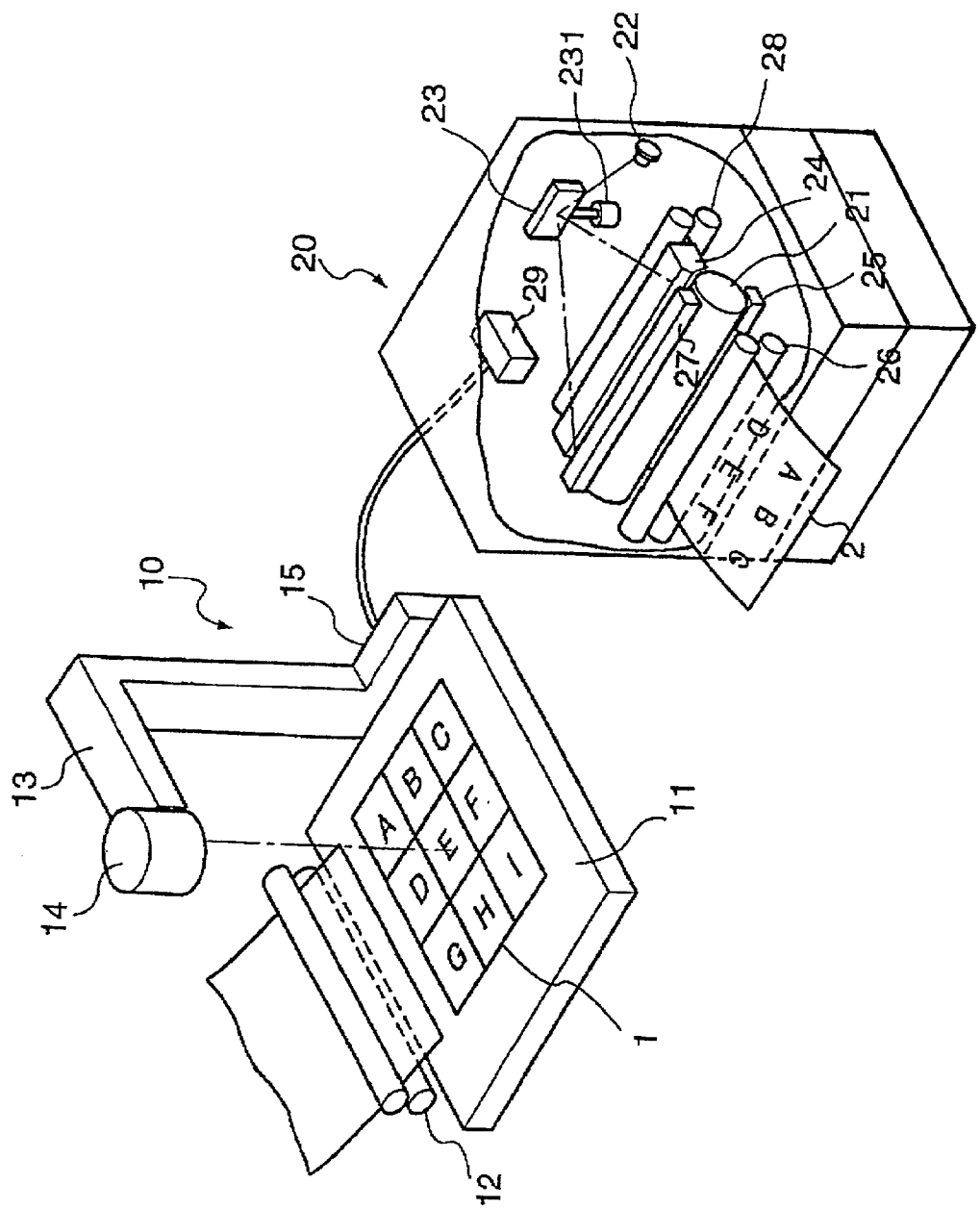
FIG. 1 shows the construction of an image input/output system of an embodiment of the present invention.

The embodiments of the present invention are described hereinafter with reference to the accompanying drawings. FIG. 1 shows an image input/output system connected to a laser printer as an image output device of the image input device of the present invention.

An image input device 10 comprises a table 11 for supporting a document 1 as a reading object, document feeder 12 for feeding a document onto the table 11, a column 13 rising upward perpendicularly from the table and bent toward the center of the table so as to be approximately horizontal, image sensing unit 14 provided on the end of the column 13 facing toward the center area of the table 11, and a control unit 15 provided with an internal control circuit.

The image input device 10 is provided with a document size sensor 107 for detecting the size of a document placed on the document table 11, and a operation panel 108 for receiving input such as paper cassette designation, magnification designation and the like. The document size sensor 107 is shown later in FIG. 4.

A laser printer 20 comprises a photosensitive drum 21, laser oscillator 22 for exposing the surface of the photosensitive drum 21, mirror 22 and mirror drive mechanism 231, developing unit 24 for developing a latent image formed on the surface of the photosensitive drum 21 via toner, transfer unit 25 for transferring a toner image formed on the surface of the photosensitive drum 21 onto a sheet 2, fixing roller 26 for foxing the toner image onto the sheet 2, charging unit 27 for uniformly charging the area of completed toner image transfer on the surface of the photosensitive drum 21 using a new optical exposure, sheet transport mechanism 28 for transporting the sheet 2 in a specific direction, and a control unit 29 provided with an internal control circuit. The laser printer 20 is provided with two paper cassettes (a first cassette and a second cassette) accommodating paper sheets such that the sheet orientations mutually differ by 90° in direction. The control unit 15 of the image input device 10 and the control unit 29 of the laser printer 20 are connected by a cable, such that the laser printer 20 is capable of printing (outputting) the image of the document 1 read by the image input device 10. A developing unit 206 (refer to FIG. 4) described later comprises the photosensitive drum 21, developing unit 24, transfer unit 25, charging unit 27, and sheet transport mechanism 28.

Figure 2:
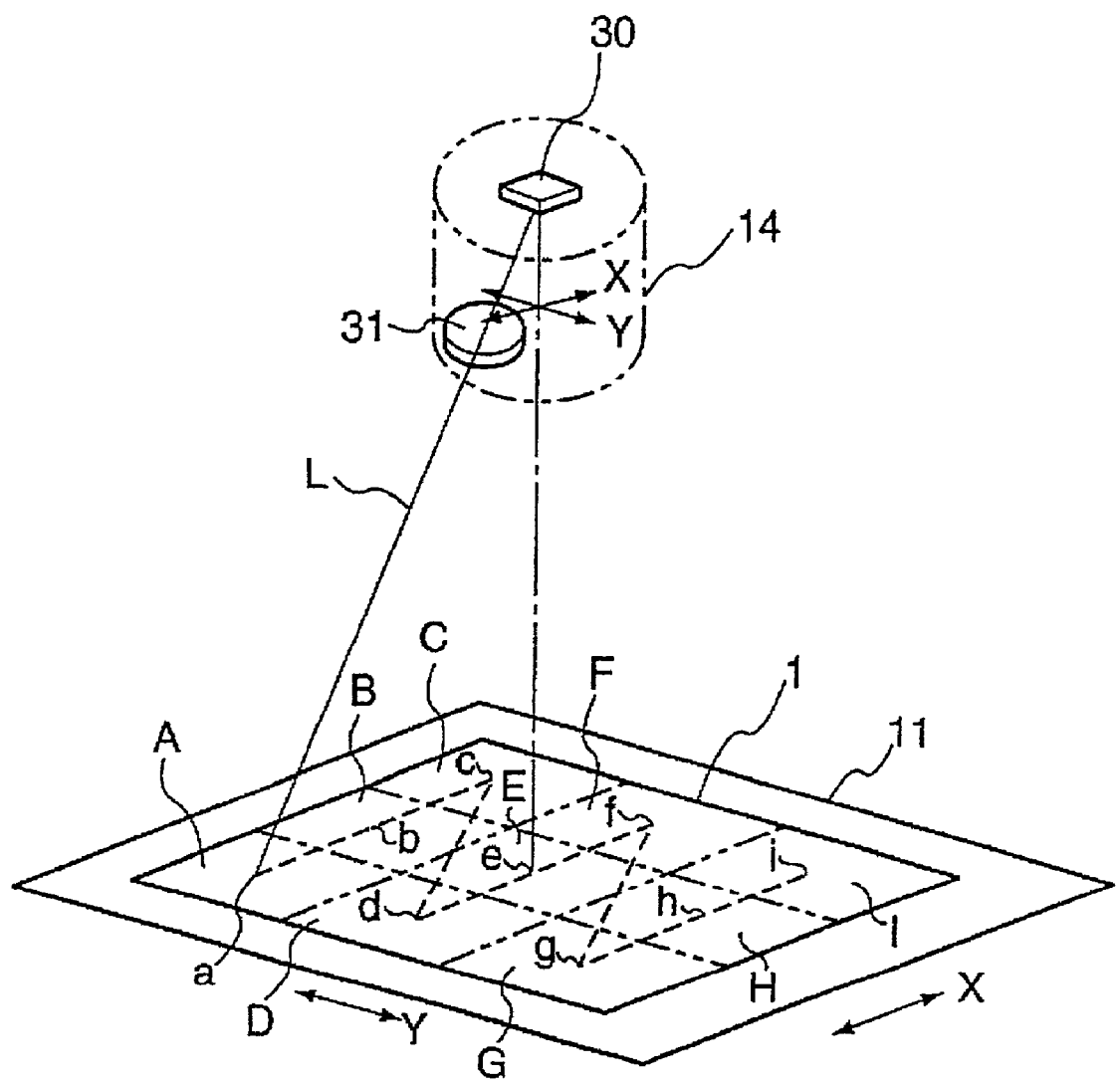
FIG. 2 shows the image sensing optical system and image sensing sequence of the embodiment of the present invention.

In the present embodiment, a two-dimensional image sensing element (area sensor) 30 such as a charge-coupled device (CCD) or the like is fixedly attached within the image sensing unit 14 so as to face a center point e of the table 11, as shown in FIG. 2. On the other hand, a taking lens 31 is constructed so as to be independently movable in mutually intersecting X direction and Y direction parallel to the table 11. The X direction and the Y direction are mutually parallel with the two edges mutually intersecting of the table 11.

Various mechanisms have been considered as the lens drive mechanism 110 (refer to FIG. 4) for independently moving the taking lens 31 in the X direction and the Y direction, including (1) providing a nut on the frame of the taking lens 31, and a mechanism for rotatably screwing a screw into the nut via a motor, (2) fixedly attaching a magnet to the frame of the taking lens 31, and providing a linear motor for linearly moving the frame of the taking lens 31 using the attraction force or the repulsion force induced by an electromagnet, (3) linearly arranging piezoelectric elements having a comb-tooth shape, and providing an ultrasonic motor for linearly moving the frame of the taking lens 31 by applying an alternating current voltage of shifted phase to each piezoelectric element. Since these drive mechanisms are well known, they are omitted from the drawings. Furthermore, a position sensor 111 (refer to FIG. 4), such as a Hal element, magnetic resistance element (MR sensor) or the like, is provided to detect the position and moving distance of the taking lens 31, the lens drive mechanism 110 is controlled using the output from the position sensor 111.

In the present embodiment, a document 1 placed on the table 11 is allocated into a plurality of sections, e.g., nine sections A~I, the image of each section A~I is formed on the photoreceptor surface of the image sensing element 30 by the taking lens 31, and the image sensing element 30 is activated to read the image data of each section A~I. Then, an image data combination process is executed by the image processor 104 and the image combination unit 105 comprising microcomputers or the like in the control unit 15, and the obtained data are output to an output device such as the laser printer 20 or the like as the image data of the document 1.

For this reason the control circuit of the control unit 15 controls the drive mechanism, such that the taking lens 31 is stopped at positions wherein the optical axis L extending from the center of the image sensing element 30 to the principal point of the taking lens 31 (hereinafter referred to as "optical axis L of the taking lens 31") passes through each center a~i in the sequence a, b, c, d, e, f, g, h, i at the center of each section A~I. The order of the stopping positions of the taking lens 31 is not limited to the above sequence, inasmuch as a, d, g, b, e, h, c, f, i sequence may be used, or another optional sequence may be used. The number of allocation regions of the document 1 is not limited to nine, and is optionally variable in accordance with the size of the document 1 and the like.

When combining the image data of each section A~I, the taking lens 31 forms an image of a somewhat larger range than each section A~I on the photoreceptor surface of the image sensor 30 to recognize the same part of the image, and the image sensing element 30 also reads the image data of a somewhat larger range than each section A~I. The image processor comprising a microcomputer or the like compares luminance distribution and the like of the overlapping areas in the image data of each section A~I, and detects areas having the same pattern. Then, adjacent image data are pasted such that areas having the same pattern are overlaid. Details of the method of pasting the image data are disclosed in, for example, Japanese Laid-Open Patent Application NO. HEI 5-198785, and are, therefore, omitted from the present description.

As can be understood from FIG. 2, the image sensing element 30 and the document 1 on the table 11 are mutually parallel, and since the taking lens 31 moves parallel to the image sensing element 30 and the table 11, the images of each section A~I of the object document 1 formed on the image sensing element 30 are mutually parallel, and the defocus and distortion of the image is extremely small. Since the image sensing element 30 is stationary, and only the taking lens 31 moves, the moving distance of the taking lens 31 is reduced and proportional to the image sensing magnification relative to the distance of each point a~i on the document 1.

For example, when the image sensing element 30 is ½ inch in size, one edge of the photoreceptor surface is reduced to approximately 10 mm, the focal length of the taking lens 31 is shortened in conjunction therewith (photographic magnification is reduced), and the opening diameter is also reduced. As a result, the size, weight, and moving distance of the taking lens 31 are reduced, making a high-speed and compact drive mechanism possible. Since the taking lens 31 is not wired, the operation of the taking lens 31 is not impeded, and the taking lens 31 is capable of zooming movement.

Although the photoreceptor surface of the image sensing element 30 is rectangular in shape, the vertical-to-horizontal ratio is small, and the difference in the moving distance of the taking lens 31 in the X direction and the Y direction is small. Accordingly, there is virtually no difference when the movement starting direction of the taking lens 31 is the X direction or the Y direction, and the main scan direction and the subscan direction of the image input device 10 may be optionally set and is modifiable.

On the other hand, in the laser printer 20, a fine-diameter laser beam emitted from the laser oscillator 22 is reflected by the mirror 23 in a specific direction, and selectively exposes the surface of the photosensitive drum 21 by scanning the surface of the photosensitive drum 21 in a direction parallel to the rotational axis of the drum. The reflective surface of the mirror 23 is, for example, a rectangle having an edge of several millimeters, such that the size and weight of the mirror 23 itself are small. For this reason the surface of the photosensitive drum 21 can be scanned at high speed even when a small driver mechanism is used as the mirror drive mechanism 231. In contrast, the sheet transport mechanism 28 has a plurality of roller pairs and the like, and each roller is slightly longer in width than the maximum width of a printable sheet 2. Furthermore, each roller has rubber or the like wrapped around a metal center shaft, and since its size and weight is extremely large compared to the mirror 23, it is difficult for the laser printer 20 to transport the sheet 2 at a high transport speed.

Accordingly, in an output device such as the laser printer 20, when there is a difference in scanning speed in the main scan direction, generally the direction in which the scanning speed is fast is designated the main scan direction and the direction in which the scanning speed is slow is designated the subscan direction to efficiently output an image. In this case the direction parallel to the shaft of the photosensitive drum 21 has a high scanning speed and is designated the main scan direction, the mirror 23 rotates reciprocatingly and the laser bema scans reciprocatingly. On the other hand, the sheet transport direction has a slow scanning speed and is designated the subscan direction, and the sheet 2 is transported continuously at constant speed.

In this laser printer 20, the sheet 2 is continuously transported in a specific direction, and it is not possible to reciprocatingly transport the sheet 2. Accordingly, the image data of each section read by the image input device 10 is stored temporarily in a buffer memory, and after the image data are combined, the data are output to the laser printer 20, or the data must be read in the sequence of the section units output by the laser printer 20. When data are output to a sheet in a horizontal direction, as shown in FIG. 1, the image data must be read in the sequence section unit A, B, C, section unit D, E, F, section unit G, H, I. In the example shown in FIG. 1, at least the sections A, B, and C must be sensed, and after the image data of each section are combined, they are output to the laser printer 20.

Figure 3:
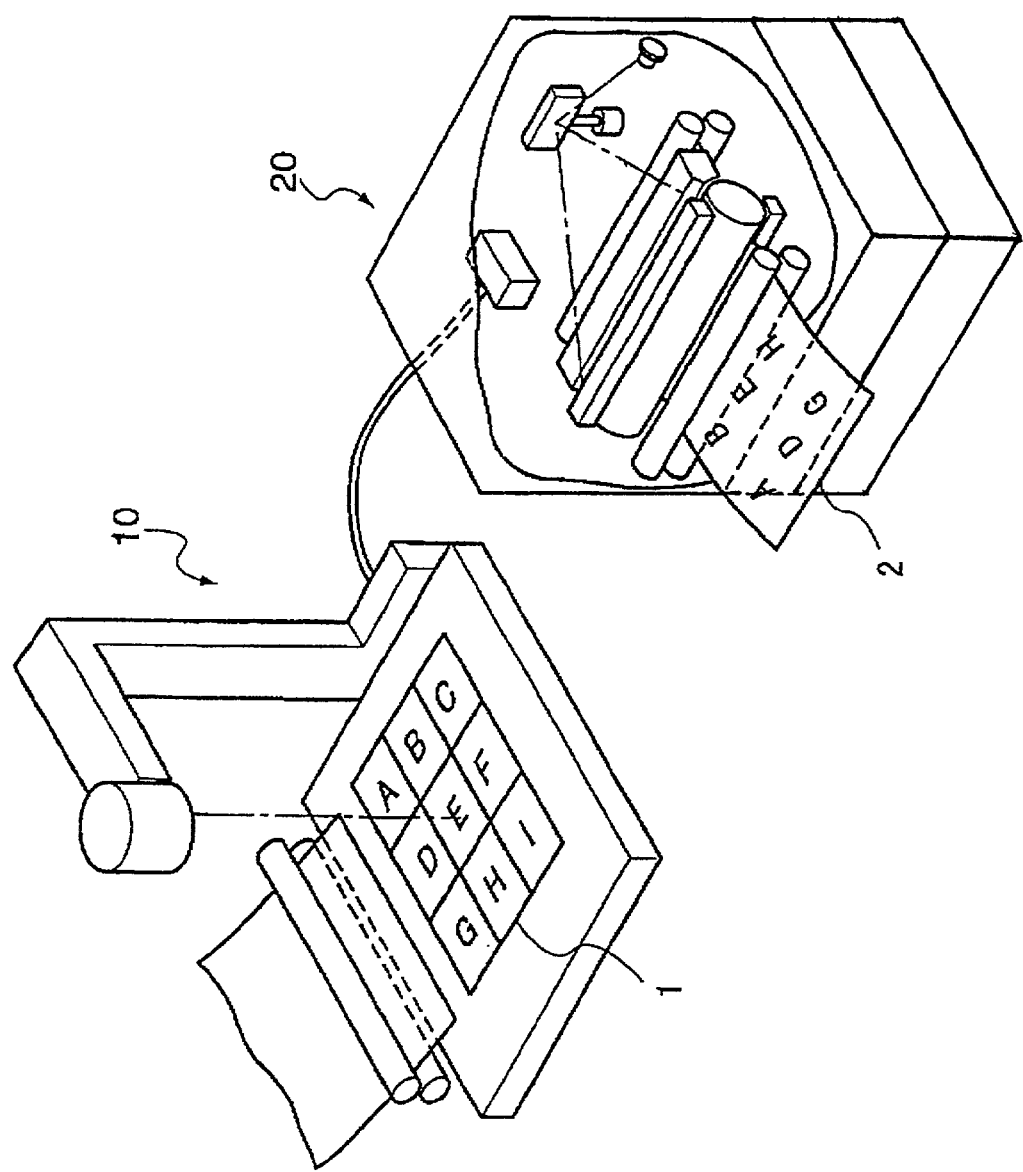
FIG. 3 shows a modification of the embodiment.

FIG. 3 shows read image data output to a sheet in a vertical direction. In this case a vertical direction sheet accommodated in the second cassette is transported, and the main scan direction and the subscan direction of the image input device 10 may switched such that the image data of section unit C, D, A and the section unit H, E, B, and the section unit I, F, C are sequentially read. When the output device is a display device such as a CRT or the like, the horizontal direction of the display screen is generally set as the main scan direction, the main scan direction and the subscan direction of the image input device 10 are determined considering the vertical direction and the horizontal direction of the document 1 and the vertical direction and the horizontal direction of the screen of the display device.

Next, we examine the number of allocated sections allocated and sensed by the image input device 10. Basically, the allocation number is determined in accordance with the quality of the image output by the output device such as laser printer 20. If a document 1 of constant size is assumed, the allocation number is determined based on the total number of pixels of the obtained image after image sensing.

For example, consider a document 1 of A4 (210×297 mm) size, and a laser printer 20 printing at a resolution of 400 dpi (dots-per-inch). In this case the number of image data required are (210×400÷25.4)×(294×400÷25.4)≈15,000,000 pixels. On the other hand, when the image sensing element 30 has 2,000,000 pixels, the equation becomes 1500÷200=7.5, and it can be understood that the desired number of pixel data can be obtained if the document 1 is allocated into eight or more (the allocation number is an integer) sections. When considering the range of white space and pasting margins of image data of each section, image sensing a document 1 divided into three sections in each of the vertical direction and horizontal direction producing nine sections A~I as shown in FIGS. 1~3 is sufficient.

Figure 4:
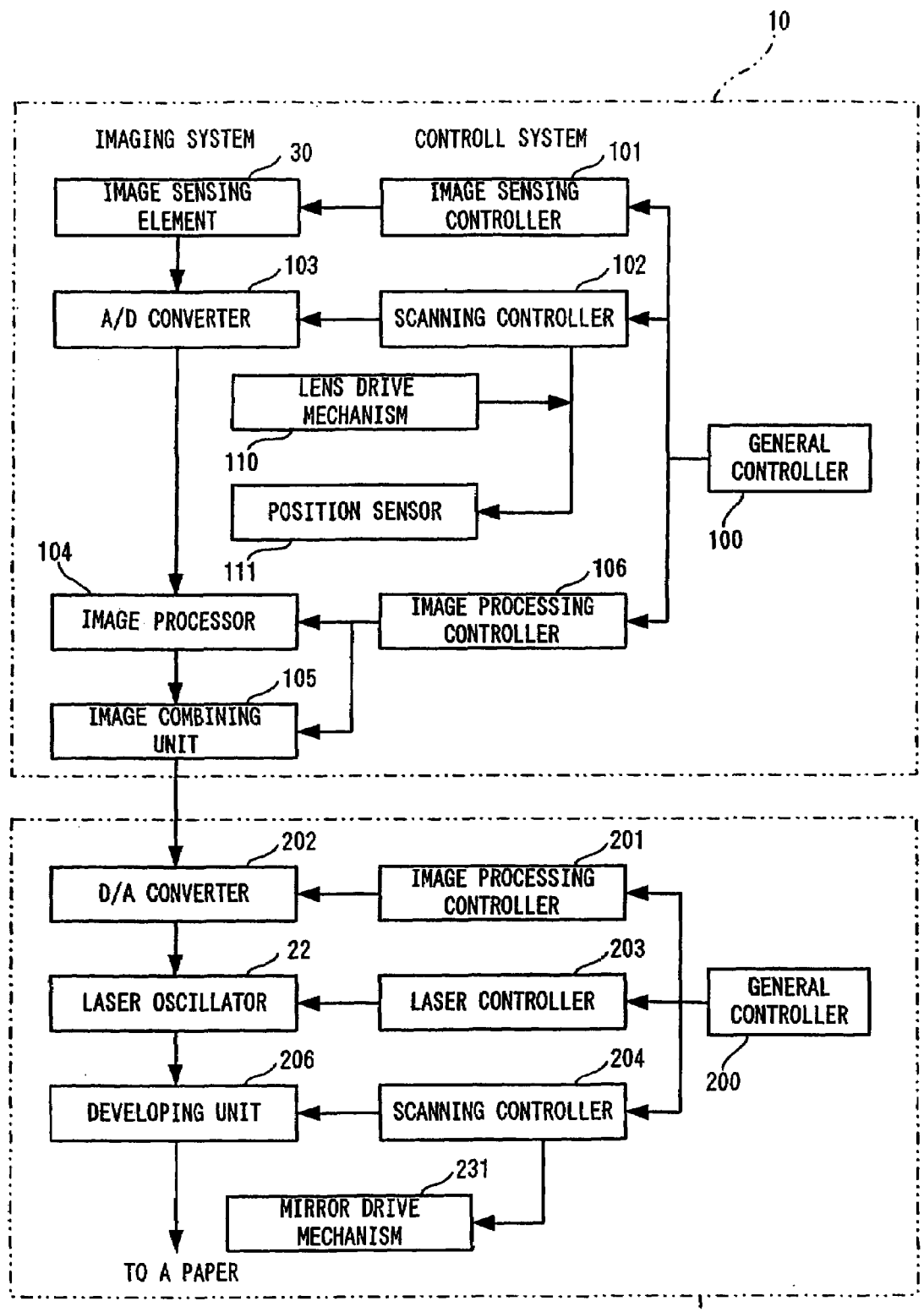
FIG. 4 shows the block structure of the image input/output system of the embodiment.

Next, FIG. 4 shows the block structure of the present embodiment. The block 10 circumscribed by the two-dot chain line in FIG. 4 includes a control circuit on the image input device 10 side comprising elements excluding image sensing element 30, lens drive mechanism 110, and position sensor 111. The control circuit includes analog elements such as an A/D converter and the like, and digital elements such as a CPU, ROM, RAM and the like, and the same CPU and like elements each have multiple functions.

The general controller 100 controls the overall operation of the image input device 10. The image sensing controller 101 controls the start of image sensing by the image sensing element 30 and the start of output of sensed image data. The scan controller 102 controls the drive and stopping of the lens drive mechanism 110 under a controller described later via the general controller 100. The sections A~I of the document 1 can be image sensed in an optional sequence by the lens drive mechanism 110 and the operation controller 102.

The A/D converter 103 converts analog image data from the image sensing element 30 to specific digital image data, and outputs the digital data to the image processor 104. The image processor 104 executes specific correction of the converted digital image data in accordance with control signals from the image processing controller 106, corrects dispersions such as transmittance of the color filters red (R), green (G), blue (B), sensitivity of the image sensing element 30 and the like, and adjusts the output signal level. The digital image data corrected by the image processor 104 are input to the image combining unit 105 and temporarily stored in RAM or the like until the image data corresponding to each section A~I is processed. The image combining unit 105 compares the luminance distributions of the digital image data of overlapping areas among the images of each section A~I and detects areas having the same pattern, then pastes the digital image data corresponding to each section A~I so as to overlap identical parts, and thereby generate data of a single complete image. Alternatively, the image combining unit 105 may manage image data corresponding to at least a first line of section A~I in the subscan direction, and thereafter combines these image data, and sequentially output to the laser printer 20 the image data of one line in the main scan direction of the laser printer 20.

The image processing controller 106 controls the operation timing of the image processor 104 and the image combining unit 105 based on the output signals of the position sensor 111 and the image sensing element 30 control signals from the image sensing controller 101, and, in the case of digital image data correction by the image processor 104, reads out correction coefficients stored in ROM or the like and determined beforehand by calibration, and outputs to the image processor 104.

On the other hand, the block 20 circumscribed by the two-dot chain line in FIG. 4 includes a control circuit on the laser printer 20 side comprising elements excluding laser oscillator 22, developing unit 206, and mirror drive mechanism 231. The control circuit includes analog elements such as an A/D converter and the like, and digital elements such as a CPU, ROM, RAM and the like, and the same CPU and like elements each have multiple functions.

The general controller 200 controls the overall operation of the laser printer 20. The image processing controller 201 controls the D/A converter 202 based on timing signals from the general controller 200, converts the digital image data from the image input device 10 to specific analog image data, and outputs the converted image data to the laser oscillator 22. The laser controller 203 controls the ON/OFF state of the laser oscillator 22 based on output signals from the D/A converter 202 and timing signals from the general controller 200. At the same time, the scanning controller 204 controls the reciprocating operation of the mirror drive mechanism 231, the drive and stopping of the sheet transport mechanism 28, and the developing process of the developing unit 206 based on timing signals from the general controller 200. Since the ON/OFF timing of the laser oscillator 22 and the operation of the mirror drive mechanism 231 are simultaneous, a latent image corresponding to the document 1 is formed on the photosensitive drum 21. Since the start of exposure on the photosensitive drum 21 and the start of transport of the sheet 2 are simultaneous, image formation starts from the leading edge of the sheet 2.

The general controller 200 selects a cassette and controls the cassette controller 205 based on the general controller 200 receiving alerts from the operation panel 108 and/or sheet size sensor 107. The relationship between the user input on the operation panel 108, the detection by the document size sensor 107, and the selection of a cassette is described below with reference to FIG. 7.

Figure 5:
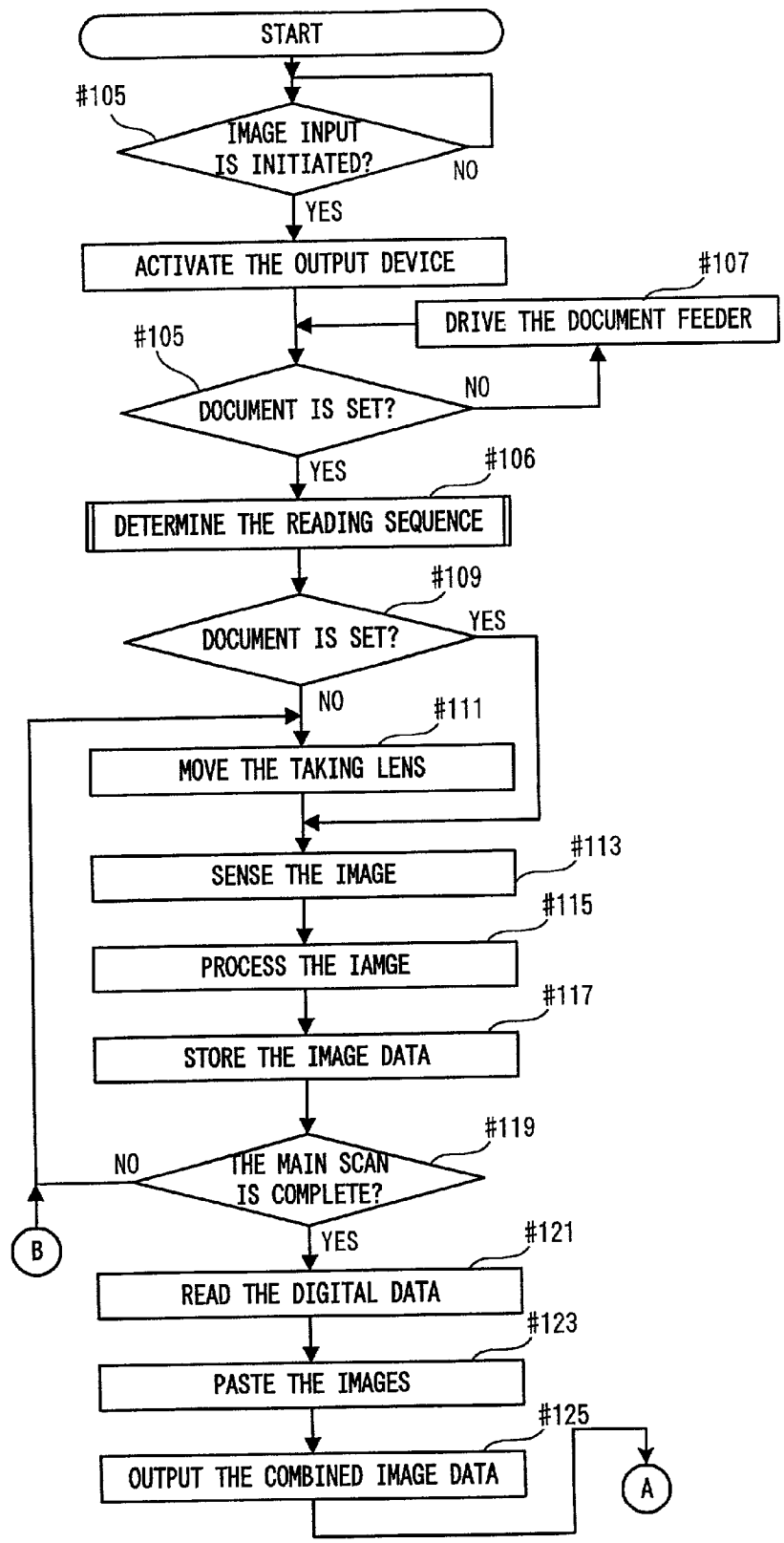
FIG. 5 is a flow chart of the image input/output operation of the embodiment.
Figure 6:
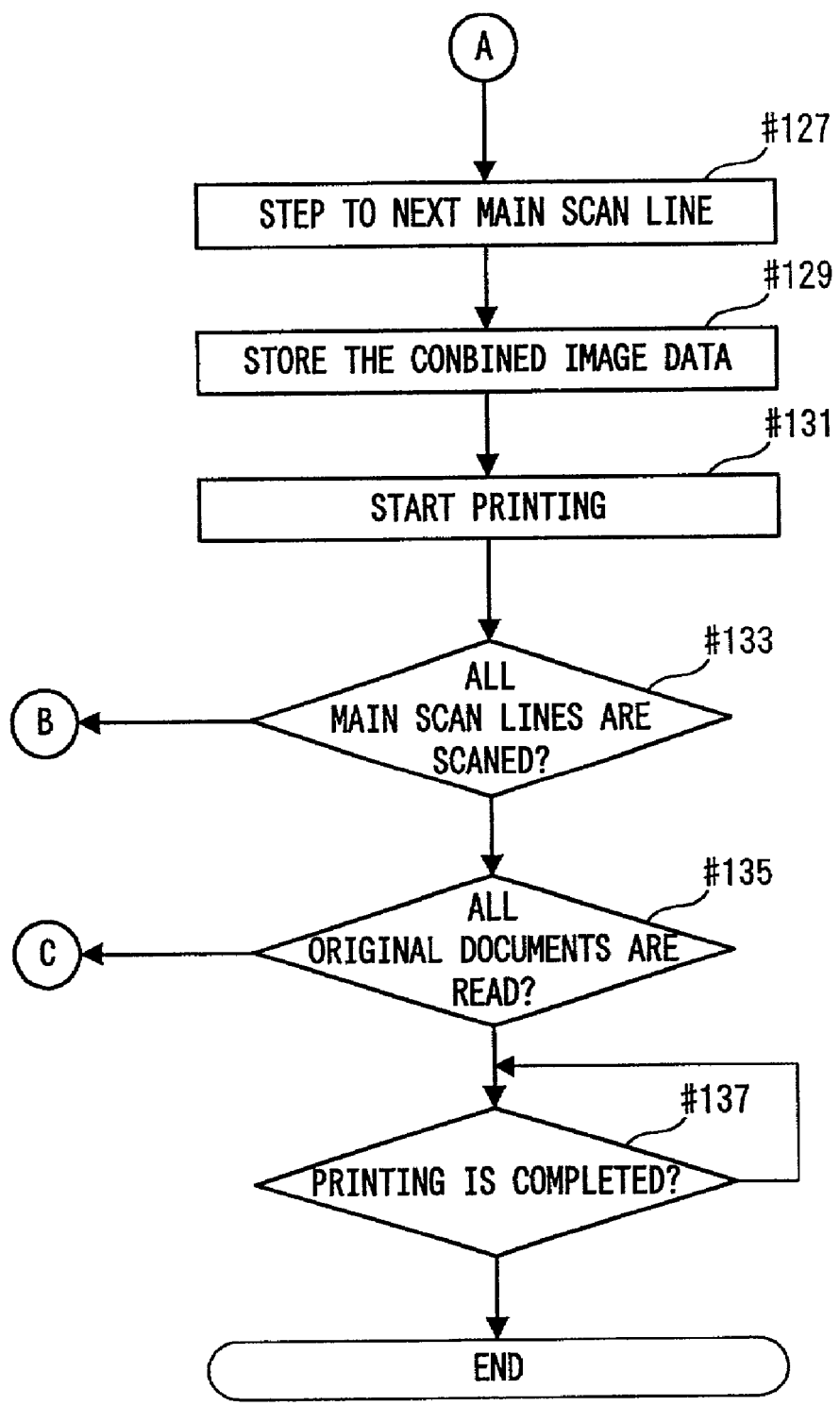
FIG. 6 is a continuation of the flow chart of FIG. 5.
Figure 7:
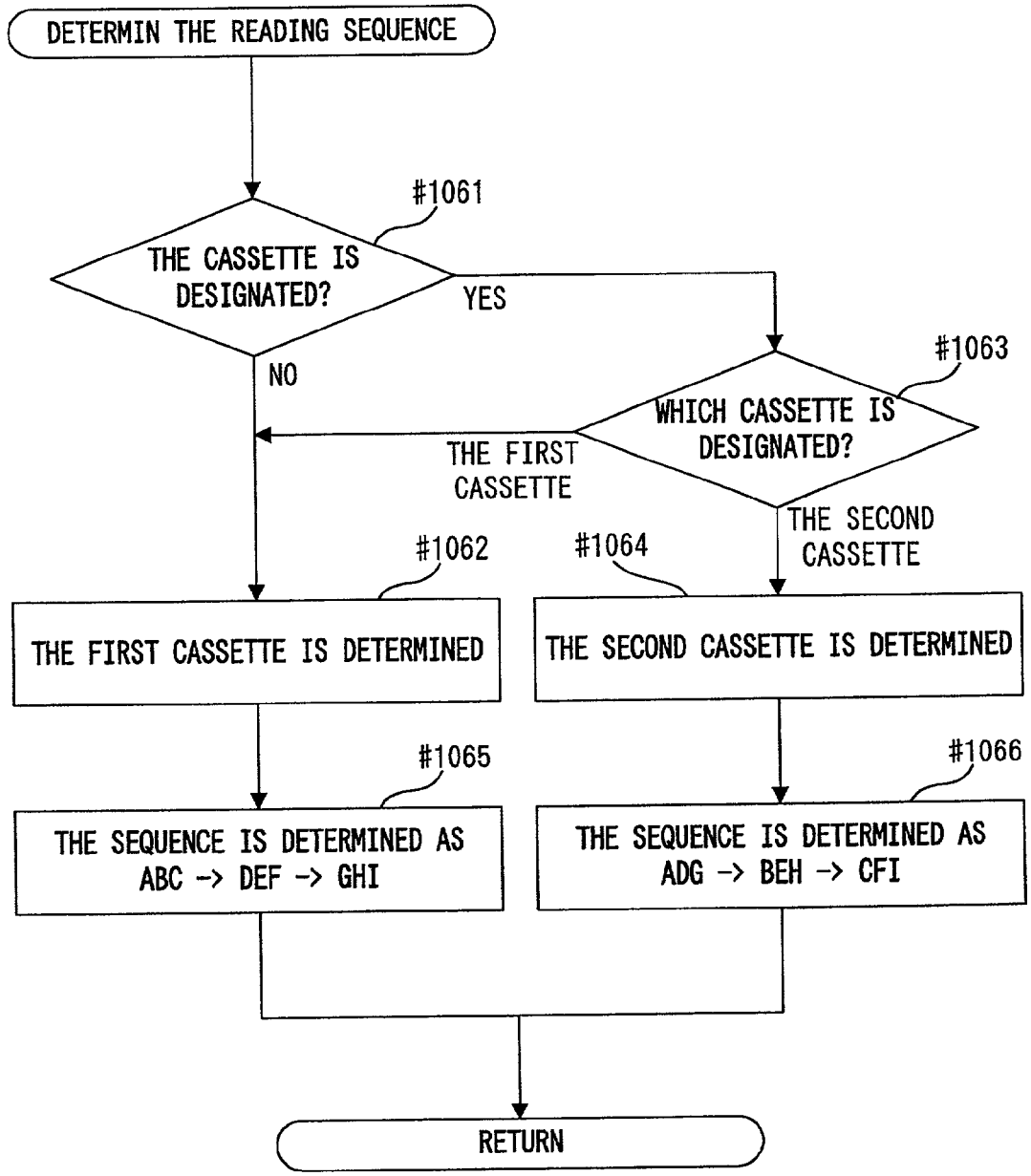
FIG. 7 is a flow chart of step #106.

The operation of the present embodiment when the image of a document 1 is image sensed by an image input device 10, and the image is printed by the laser printer 20 is described below with reference to the flow charts of FIGS. 5~7.

When a main switch (not shown in the drawings) provided on the control unit 15 or the like of the image input device 10 is turned ON, the general controller 100 of the image input device 10 determines whether or not a user has specified the start of image input (step #101). When image input start has been specified (step #101: YES), the general controller 100 outputs a start signal to the general controller 200 of the laser printer 20 acting as the output device, and starts the laser printer 20 (step #103).

The general controller 100 determines whether or not a document 1 is placed on the table 11 (step #105), and when a document 1 is not present, the document feeder 12 is actuated and a document 1 is placed on the table 11 (step #107).

When a document 1 is placed on the table 11 (step #105: YES), the general controller 200 executes a reading sequence determination process (step #106). FIG. 7 is a flow chart showing the sequence of the reading sequence determination process. In the reading sequence determination process, a check is made to determine whether or not a user has specified a cassette (step #1061). In this embodiment, when a cassette is not specifically user-specified, the first cassette accommodating sheets in the horizontal direction is selected (step #1062), and when a user has specified a cassette using the operation panel 108 or the like, a cassette is selected based on the user specification (step #1063). When a user has specified the first cassette, the first cassette is determined (step #1062), and when a user has specified the second cassette, the second cassette is determined (step #1064).

Then, when the cassette has been determined, the reading sequence of the image sensing unit is determined based on the aforesaid determination. Specifically, the general controller 200 drives the lens drive mechanism 110 in the sequence of section unit A, B, C, section unit D, E, F, and section unit G, H, I, when the first cassette is set (step #1065). On the other hand, the general controller 200 drives the lens drive mechanism 110 in the sequence of section unit A, D, G, section unit B, E, F, and section unit C, F, I, when the second cassette is set (step #1065).

When the reading sequence has been set, the scanning controller 102 determines whether or not the optical axis L of the taking lens 31 is at image sensing start position, i.e., the optical axis L faces the image sensing center point a of section A (step #109). When the optical axis L of the taking lens 31 does not face the image sensing start position (step #109: NO), the scanning controller 102 drives the lens drive mechanism 110 while monitoring the output signals from the position sensor 111, and moves the taking lens 31 to a specified position (step #111).

When the optical axis L of the taking lens 31 initially faces the image sensing start position (step #109: YES) and the when the taking lens 31 is moved to the specified position in step #111, the scanning controller 101 controls the image sensing element 30 so as to sense the image of section A (step i.e., read the image data) (step #113). When the image sensing by the image sensing element 30 ends, conversion of the analog image data to digital image data is accomplished by the A/D converter 103 and image processing such as correction of the digital image data are performed by the image processor 104 (step #115), and the processed digital image data are temporarily stored in RAM or the like (step #117). Then, the general controller 100 determines whether or not image sensing has ended for all sections A~C of the first line in the main scan direction (step #119). Since image sensing of only section A is completed at this time (step #119: NO), the routine returns to step #111, and the scanning controller 102 drives lens drive mechanism 110 so as to position the optical axis of the taking lens 31 to face the image sensing center point b of section B while monitoring the output signals of the position sensor 111.

Thereafter, digital image data of section B are obtained in accordance with the sequence of steps #113~117. The digital image data of section C is similarly obtained.

When the digital image data are obtained for all sections A~C of the first line in the main scan direction (step #119: YES), the image combination unit 105 reads the digital image data of all section A~C stored in ROM or the like (step #121), compares the luminance distribution and the like of overlap areas in the digital image data of each section, examines the duplicated areas of the image, and pastes the images (step #123). After performing various image processes as necessary, the single combined image data are output to a printer or the like (step #125).

The scanning controller 102 controls the lens drive mechanism 110 so as to position the optical axis L of the taking lens 31 to face the second line in the main scan direction (step #127). In a parallel operation, the general controller 200 of the laser printer 20 temporarily stores in memory the image data received from the image input device 10 (step #129), and starts printing the image on a sheet 2 using the image data stored in the memory (step #131).

Then, the general controller 100 determines whether or not the image sensing is completed for all lines in the subscan direction (step #133). Since only the first line has been image sensed at this time (step #133: NO), the routine returns to step #111, and the scanning controller 102 drives lens drive mechanism 110 so as to position the optical axis of the taking lens 31 to face the image sensing center point d of section D while monitoring the output signals of the position sensor 111. Thereafter, digital image data of section D~F are obtained in accordance with the sequence of steps #113~117, the image combination process is performed in accordance with the sequence of steps #125~127, and the single combined image data are output to the laser printer 20. The image data of sections G~I of the third line are similarly obtained.

When image reading (image sensing) of all lines in the subscan direction is completed (step #133: YES), the general controller 100 for the image input device 10 determines whether or not another document remains in the document feeder 12, i.e., determines whether or not image input of all documents is completed (step #135). When image input of all documents has not been completed, the routine returns to step #107, and the general controller 100 drives the document feeder 12 to replace the document on the table 11 with a new document, and steps #105~135 are repeated to read the image data of the document.

When the reading of image data of all documents has been completed step #135: YES), the general controller 100 of the image input device 10 determines whether or not printing has been completed through the general controller 20 of the laser printer 20 (step #137). As previously described, the image data of the second line in the main scan direction (image data corresponding to sections D~F) are read by the image input device in an operation running in parallel with the operation of the laser printer 20 printing the image data on a sheet 2 using the image data of the first line in the main scan direction (image data corresponding to sections A~C) from the image input device. Accordingly, if the moving speed of the taking lens 31 in the main scan direction and the subscan direction of the image input device 10 and the sheet transport speed of the laser printer 20 are adjusted such that the image data of the second line are read before the laser printer 20 completes image formation of the image of the first line in the main scan direction (image data corresponding to sections D~F) by the image input device 10, the image input operation by the image input device 10 and the printing operation of the laser printer 20 can be performed without interruption. In this case the time required for printing by the laser printer 20 becomes the time required for image input by the image input device 10 plus the time required for forming the image of one line in the main scan direction of the image input device 10, thereby reducing time loss.

Although a laser printer is used as the output device in the present embodiment, the present invention is not limited to laser printer, and is similar effective for inkjet printers, thermal transfer printers and the like. Furthermore, the output device is not limited to printers, and may be a display device such as a CRT, liquid crystal display, plasma display and the like.

Whereas the present embodiment has been constructed such that the image sensing element 30 is stationary relative to the table 11 and the document 1 placed thereon with the taking lens 31 moving parallel to the table 11, the present invention is not limited to this arrangement inasmuch as the image sensing element 30 and the taking lens 31 may be integrated and stationary relative to a frame, with the image sensing element 30 and the taking lens 31 moving parallel to the table 11. Alternatively, the a movable mirror may be provided in part of the optical system so as to scan by the mirror.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image reading apparatus comprising:
   an image sensing unit for reading two-dimensional partial areas into which a specific region is divided;
   a processor for variously setting a reading sequence for the reading of a plurality of the partial areas; and
   a controller for controlling the image sensing unit so as to read the plurality of the partial areas in the set reading sequence.

2. The image reading apparatus as claimed in claim 1, wherein the plurality of two-dimensional partial areas aligns in a vertical direction and a horizontal direction as sort of a matrix.

3. The image reading apparatus as claimed in claim 2, wherein the image sensing unit reads the plurality of partial areas sequentially in a horizontal direction or a vertical direction.

4. The image reading apparatus as claimed in claim 1, wherein the image sensing unit includes an area sensor for receiving an optical image and converting the image to image data, and an optical system for directing an optical image of the partial area of a fixed original in the specific region to the area sensor, and wherein the controller moves the optical system relative to the specific region in accordance with the set reading sequence.

5. The image reading apparatus as claimed in claim 1, wherein the processor sets the reading sequence based on instructions from a connected output device for the output of a read image.

6. The image reading apparatus as claimed in claim 5, wherein the output device is an image forming apparatus for outputting read images on a sheet, and the instructions are related to the orientation of the sheet on which the image to be formed.

7. An image reading apparatus comprising:
   an image sensing element for receiving an optical image in a two-dimensional section and converting the image to image data;
   a mechanism for sequentially directing optical images of a plurality of sections, into which a specific region is divided, to the image sensing element one by one in a predetermined sequence; and
   a controller for variously controlling the predetermined sequence.

8. The image reading apparatus as claimed in claim 7, wherein the image sensing element includes an area sensor.

9. The image reading apparatus as claimed in claim 7, further comprising a document table for placing a document, wherein the specific region corresponds to a document placed on the document table.

10. The image reading apparatus as claimed in claim 9, wherein the mechanism includes an optical system for projecting the optical image in the specific region and sequentially directs the optical images by moving the optical system relative to the image sensing element and the document table.

11. The image reading apparatus as claimed in claim 7, wherein the mechanism includes an optical system for projecting the optical image in the specific region and sequentially directs the optical images by moving the optical system and the image sensing element relative to the document table.

12. An image input/output system comprising:
    an input device for inputting a plurality of partial images of a document in a predetermined sequence;
    an output device for outputting an entire image of the document by pasting the plurality of partial images to each other onto a sheet,
    wherein the output device sequentially outputs image from one edge of the sheet to an opposed edge thereof, and the predetermined sequence depends on orientation of the sheet onto which the image is to be outputted.

13. The image input/output system as claimed in claim 12, wherein the input device includes a document table on which a document is placed, and the input device inputs the partial images from above the placed document.

14. The image input/output system as claimed in claim 12, wherein the previously inputted partial images are sequentially outputted before the input of all of the partial images of the entire document is completed.

15. The image input/output system as claimed in claim 12, further comprising an operation panel for receiving an instruction, which specifies the predetermined sequence, from an operator.

16. The image input/output system as claimed in claim 15, wherein the output device includes an image forming portion for forming the inputted images onto the sheets having different orientations.

* * * * *